Patented May 22, 1945

2,376,740

UNITED STATES PATENT OFFICE 2,376,740

INSECTICIDAL TREATMENT OF COTTON PLANTS

Harold A. Waters and Charles Meadows, Columbus, Ohio, assignors to The Sherwin-Williams Company, Cleveland, Ohio, a company of Ohio No Drawing. Application May 31, 1941, Serial No. 396,168

6 Claims. (Cl. 167—15)

Among the pests which infest the cotton plant are the boll weevil which attack the cotton boll, and aphids which suck juice from the foliage. Under uncontrolled conditions the former is the more serious, as it attacks the part of the plant which is commercially valuable, and the damage done to the foliage by the aphids is not particularly serious.

It has been discovered that spraying or dusting the plants with calcium arsenate is very effective in protecting the plant from the action of the boll weevil, but it was soon found that successive applications on cotton of the ordinary type of the calcium arsenate commonly used, frequently resulted in the damaging infestation of aphids. In some cases the aphids rapidly became so abundant and the damage done by them so great that the plant suffered from premature defoliation, reduction of yield, and coating of the cotton in the open bolls with "honey-dew," a syrup-like secretion of the aphids which makes picking difficult and lowers the grade of the cotton.

It was at one time thought that the increase in the aphid development on plants sprayed or dusted with calcium arsenate solution was due to the killing off of natural enemies of the aphids, but apparently that is not the case.

It has been discovered that if the calcium arsenate be treated so as to substantially reduce the amount of arsenic which can or will go into the solution from the calcium arsenate under the action of dew or other moisture and the carbon dioxide of the air, the calcium arsenate will retain its full effectiveness to kill the boll weevil, but without causing serious increase in aphid production.

It has been found that the normal plant juice of the leaves of the cotton plant is slightly acid and about pH 5.2 and that the less acid there is in the juice, the more the aphids thrive and multiply. The usual calcium arsenate used on cotton plants to kill boll weevil contains some arsenic which will go into solution by the action of the dew or other moisture with or without the action of $CO_2$ of the air, and this arsenic solution, upon entering the leaves, neutralizes the acid of the juice to such an extent that the aphids will thrive on the juice of reduced acidity, even though the acidity may be reduced only from pH 5.2 to pH 5.8. By reducing the percentage of arsenic which can go into solution under the conditions of use, the acidity of the plant juice is changed to a correspondingly lesser extent. The more nearly the juice remains at its normal acidity, the less is the abnormal stimulation to aphid development.

Tests show that the standard calcium arsenate commonly used for killing boll weevil has a soluble $As_2O_5$ content of about 4.0% or higher, and that by treating it with zinc sulphate, the soluble $As_2O_5$ content is very much less. When it is reduced to about 1.6% it will release so little soluble arsenic on the foliage that there is very little increase in aphid development on the foliage over that occurring on the normal unsprayed plants. As a result of one test, the following results were obtained:

| Material | Aphids per 100 square inches of leaf |
| --- | --- |
| Untreated | 40 |
| Zinc safened calcium arsenate | 53 |
| Standard calcium arsenate | 250 |

In each case the count was made on the treated plants approximately four weeks after the first treatment. It will be noted that with the zinc safened calcium arsenate there were very few more aphids than on the untreated plants, whereas with the plants treated with standard calcium arsenate, the increase over the untreated plants was over sixfold. In each case the counts were made according to standard procedure followed by Government entomologists, and on the fourth leaf from the top of the plant.

In another test made on fifteen acres of cotton dusted with zinc safened calcium arsenate by airplane, and fifteen acres of cotton dusted with standard calcium arsenate, and on untreated cotton, the first and last aphid counts were as follows:

| Material | Aphids per 100 square inches of leaf | |
| --- | --- | --- |
| | August 22 | September 12 |
| Untreated | 13 | 379 |
| Zinc safened calcium arsenate | 19 | 456 |
| Standard calcium arsenate | 112 | 1598 |

The material may be applied by spraying or by dusting and various other ingredients may be added, which, in the opinion of the manufacturer or user, may be beneficial. We are aware that zinc sulphate has been proposed as an ingredient of insecticides, but in the present case it apparently does not act directly as an insecticide, but only acts in conjunction with the calcium arsenate to prevent the great increase in aphid development, which would otherwise occur as a result of the use of ordinary calcium arsenate.

Broadly considered, our invention involves the treatment of calcium arsenate with salts of heavy metals in such a way as to reduce the water soluble $As_2O_5$ content without detracting from the effectiveness of the calcium arsenate as an insecticide for the boll weevil. The extent to which the water soluble $As_2O_5$ is reduced may vary, but it has been found by test that if it be reduced to about 1.6%, very effective results are obtained and even better results are obtained by further reduction of the soluble arsenic content. In practice we prefer to have it not over 1.25%. By the use of such product there is little or no increase in aphid population on the cotton following successive applications of the insecticide. Consequently, the plants retain their foliage and develop normally, and the cotton is not coated with "honeydew." By means of our invention it is possible to obtain satisfactory control of the boll weevil without inducing the development of damaging populations of aphids.

In preparing the insecticide the calcium arsenate is treated during the course of manufacture, and in such a way that the final product has the specified low percentage of water-soluble $As_2O_5$. The treatment may be effected as follows:

First a good grade of calcium arsenate is prepared by slowly adding arsenic acid solution to a slurry of well slaked lime under conditions of rapid agitation, at a temperature of 90° C. or higher, until the $As_2O_5$ content is 45 to 46%. Next, under the above conditions of rapid agitation and high temperature, a solution of zinc sulphate is slowly added in such quantity that the final dried product analyzes approximately 3.2% zinc. There must be sufficient free lime present to react with all this zinc sulphate. The slurry is then filtered, dried and ground in the usual manner. The dried product will then analyze 42 to 43% $As_2O_5$. By the Geneva method the water-soluble $As_2O_5$ should be 1.6% or less.

The following is a method of testing the product:

Two grams of zinc treated calcium arsenate is suspended in one liter of distilled water. Free lime, if present, is exactly neutralized by adding a carbonic acid solution using thymol phthalein as an indicator, or by bubbling uncontaminated air through the suspension. Next, uncontaminated air is bubbled through the suspension until the $CO_2$ of the air and the dissolved arsenic are in equilibrium. The water-soluble $As_2O_5$ is determined at this point and should not be over about 1.6%.

It must be pointed out that the above procedure is given as an ideal procedure only, and it is not intended to imply that this is the only method by which a satisfactory zinc "safened" calcium arsenate can be made. There is a definite interrelationship between temperature, concentration of ingredients, degree of agitation, rate of addition and degree of atomization of the arsenic acid and zinc sulphate solutions. Any one of these factors may be varied if compensating variations are made in one or more of the others, and still produce a satisfactory zinc safened calcium arsenate. Thus it is possible to prepare a satisfactory product from a slurry of ordinary calcium arsenate, having an original soluble $As_2O_5$ of 4% or more. Also, it is possible to prepare a satisfactory product using less zinc salt than given above, providing the original calcium arsenate is so prepared that it consists largely of basic calcium arsenate and has a low original soluble arsenic content.

A satisfactory safened calcium arsenate can likewise be prepared by using salts of zinc other than the sulphate, such as the chloride, nitrate, acetate, etc. When such a salt, which yields a soluble product by double decomposition with lime, is used, the slurry must be filtered and washed to remove this soluble material before drying and grinding. The sulphate salt of zinc has been selected as it is the cheapest zinc salt, and because it forms an insoluble product with lime, that does not have to be removed.

The salts of heavy metals other than zinc, such as copper, manganese, aluminum, chromium and iron, can likewise be used to reduce the soluble $As_2O_5$ content of calcium arsenate. Zinc sulphate has been selected because it is the cheapest and because there is considerable latitude in its use. The other metals are either higher in price or require more rigid conditions of manufacture to prepare a satisfactory product. For example the copper reaction products tend to decompose to copper oxide unless special precautions are taken, and iron may reduce the insect toxicity of calcium arsenate if the product is not prepared under very specific conditions.

Having described our invention, what we claim as new and desire to secure by Letters Patent is:

1. The process of insect control for cotton plants, which includes treating a water suspension of calcium arsenate with a solution of a salt of a heavy metal at a high temperature to reduce the water-soluble $As_2O_5$ content to not substantially over 1.6%, and applying the calcium arsenate so treated to the cotton plant.

2. The process of insect control for cotton plants, which includes treating a water suspension of calcium arsenate with a solution of a zinc salt at a temperature of at least 90° C to reduce the water-soluble $As_2O_5$ content to not substantially over 1.6%, and applying the calcium arsenate so treated to the cotton plant.

3. The process of insect control for cotton plants, which includes heating a water suspension of calcium arsenate with a solution of zinc sulphate to reduce the water-soluble $As_2O_5$ content to not substantially over 1.6%, and applying the calcium arsenate so treated to the cotton plant.

4. The method of killing boll weevil and at the same time inhibiting development of aphid population on the foliage of cotton plants, which includes applying to the plant calcium arsenate, the soluble $As_2O_5$ content of which has been reduced to not to exceed 1.6% by heating a water suspension of said calcium arsenate to at least 90° C. in a solution of a salt of a heavy metal.

5. The method of killing boll weevil and at the same time inhibiting development of aphid population on the foliage of cotton plants, which includes applying to the plant calcium arsenate, the soluble $As_2O_5$ content of which has been reduced to not to exceed 1.6% by heating a water suspension of said calcium arsenate to at least 90° C. in a solution of a zinc salt.

6. The method of killing boll weevil and at the same time inhibiting development of aphid population on the foliage of cotton plants, which includes applying to the plant calcium arsenate, the soluble $As_2O_5$ content of which has been reduced to not to exceed 1.6% by heating a water suspension of said calcium arsenate to at least 90° C. in a solution of zinc sulphate.

HAROLD A. WATERS.
CHARLES MEADOWS.